(12) United States Patent
Mandich et al.

(10) Patent No.: US 6,334,338 B1
(45) Date of Patent: *Jan. 1, 2002

(54) SOL GEL PROCESS OF MAKING A FIBER PREFORM WITH REMOVAL OF OXIDE PARTICLES

(75) Inventors: Mary Louise Mandich, Martinsville; William David Reents, Jr., Middlesex, both of NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,827

(22) Filed: Jul. 2, 1998

(51) Int. Cl.$^7$ ............................................... C03B 37/016
(52) U.S. Cl. .............................. 65/395; 65/412; 65/426
(58) Field of Search .......................... 65/395, 412, 420

(56) References Cited

U.S. PATENT DOCUMENTS

| | | | |
|---|---|---|---|
| 4,217,027 A | 8/1980 | MacChesney et al. ...... 350/96.3 |
| 4,262,035 A | 4/1981 | Jaeger et al. .................. 427/39 |
| 4,264,347 A | * 4/1981 | Shintani | |
| 4,338,111 A | 7/1982 | Edahiro et al. ............... 65/18.2 |
| 4,426,216 A | 1/1984 | Satoh et al. ................... 65/18.1 |
| 4,775,401 A | 10/1988 | Fleming et al. ............... 65/3.11 |
| 4,902,325 A | * 2/1990 | Kyoto .......................... 65/900 |
| 4,909,816 A | 3/1990 | MacChesney et al. ........ 65/3.12 |
| 4,969,941 A | * 11/1990 | Kyoto ....................... 65/374.15 |
| 5,240,488 A | 8/1993 | Chandross et al. ........... 65/3.11 |
| 5,344,475 A | 9/1994 | Bhandarkar et al. .......... 65/395 |
| 5,356,447 A | 10/1994 | Bhandarkar ................... 65/395 |

FOREIGN PATENT DOCUMENTS

| | | | |
|---|---|---|---|
| EP | 0 189 865 B1 | 4/1990 | ............ C03C/13/04 |
| EP | 0 170 249 B1 | 12/1991 | .......... C03B/37/018 |
| EP | 0 614 856 A1 | 9/1994 | .......... C03B/37/016 |
| GB | 0140651 | 10/1984 | |
| GB | 2165233 | 4/1986 | |
| GB | 0614856 | 9/1994 | |
| JP | 56100145 | 8/1981 | |
| JP | Hei 1-164740 | 6/1989 | .......... C03B/37/018 |
| JP | 04077327 | 3/1992 | |

OTHER PUBLICATIONS

Kleiner, K.E., "Determination of oxygen in metals and oxides by use of sulfur monochloride. I. Determination of oxygen in the oxides of aluminum, manganese, copper, and iron, and in barium sulfate", *Ukrain. Khim. Zhur.* 22, 809–812 (1956).

Kleiner, K.E. et al., "Determination of oxygen in metals and oxides by means of sulfur monochloride. II. Determination of oxygen in the oxides of zirconium and boron and the action of the sulfur monochloride on various substances", *Ukrain. Khim. Zhur.,* 23, 236–238 (1957).

Kleiner, K.E. et al., "Determination of oxygen in metals and oxides by means of sulfur monochloride. III. Determination of oxygen in oxides of chromium, titanium, zirconium, and in several metals and alloys", *Ukrain. Khim. Zhur.,* 25, 370–373 (1959).

Kleiner, et al. "Oxygen determination in metals and oxides by methods involving treatment with sulfur and sulfur monochloride", *Nauk S.S.S.R., Inst. Geokhim. I Anal. Khim.,* 10, 150–157 (1960).

Glukhov, I.A. et al., "Sulfur–chlorine system", Akad. Nauk Tadzh. SSR., Otd. Fiz.–Mat. Geol.–Khim. Nauk, (2), 54–57 (1971).

Lukens, H.S., "A study of the action of sulfur monochloride on certain minerals", *J. Am. Soc.,* 35, 1464–1469 (1913).

Sulfide Glass Fibers for Infrared Transmission by Snibata, S. et al., *Mat. Res. Bull.,* vol. 16, pp. 703–714, pp. 703–714 (1981).

"Sulfur Chlorides", *Stauffer Chemical Co.,* pp. 1–14 (1985).

"Fiber Drawing and Strength Properties", by DiMarcello, F., *Optical Fiber Communications,* vol. 1, Academic Press, Inc., pp. 179–248 (1995).

Chemical Abstracts, vol. 112, No. 8, abstract No. 61546, XP002115418 (1990).

* cited by examiner

*Primary Examiner*—John Hoffman
(74) *Attorney, Agent, or Firm*—Scott Rittman

(57) ABSTRACT

Fiber is drawn from a preform comprising a silica body, e.g., a sol-gel derived overcladding or substrate tube. Prior to sintering, the body is treated with a gaseous mixture containing one or more non-oxygenated sulfur halides, to remove and/or reduce the size of refractory oxide particles, and/or dehydroxylate the body. Removal of metal oxide particles or reduction in their size contributes to drawing of optical fiber exhibiting desirable strength, since such particles act as initiation sites for breakage. Advantageously, the halides include sulfur chlorides, which provide desirable improvements compared to treatment by oxygenated sulfur chlorides such as thionyl chloride ($SOCl_2$).

1 Claim, 1 Drawing Sheet

SOL GEL PROCESS OF MAKING A FIBER PREFORM WITH REMOVAL OF OXIDE PARTICLES

BACKGROUND OF THE INVENTION

1. Field of the Invention

The invention relates to fabrication of optical fiber from silica preforms, particular preforms comprising overcladding and/or substrate tubes formed from sol-gel processes.

2. Discussion of the Related Art

Glass optical fiber is produced from a glass preform. As discussed in F. DiMarcello et al. "Fiber Drawing and Strength Properties," *Optical Fiber Communications,* Vol. 1, Academic Press, Inc., 1995, at 179–248, the disclosure of which is hereby incorporated by reference, the preform is generally arranged vertically in a draw tower such that a portion of the preform is lowered into a furnace region. The portion of the preform placed into the furnace region begins to soften, and the lower end of the preform forms what is known as the neck-down region, where glass flows from the original cross-sectional area of the preform to the desired cross-sectional area of the fiber. From the lower tip of this neck-down legion, the optical fiber is drawn.

Optical transmission fiber typically contains a high-purity silica glass core optionally doped with a refractive index-raising element such as germanium, an inner cladding of high-purity silica glass optionally doped with a refractive index-lowering element such as fluorine, and an outer cladding of undoped silica glass. In some manufacturing processes, the preforms for making such fiber are fabricated by forming an overcladding tube for the outer cladding, and separately forming a rod containing the core material and inner cladding material. The core/inner cladding are fabricated by any of a variety of vapor deposition methods known to those skilled in the art, including vapor axial deposition (VAD), outside vapor deposition (OVD), and modified chemical vapor deposition (MCVD). MCVD is discussed in U.S. Pat. Nos. 4,217,027; 4,262,035; and 4,909,816, the disclosures of which are hereby incorporated by reference. MCVD involves passing a high-purity gas, e.g., a mixture of gases containing silicon and germanium, through the interior of a silica tube (known as the substrate tube) while heating the outside of the tube with a traversing oxy-hydrogen torch. In the heated area of the tube, a gas phase reaction occurs that deposits particles on the tube wall. This deposit, which forms ahead of the torch, is sintered as the torch passes over it. The process is repeated in successive passes until the requisite quantity of silica and/or germanium-doped silica is deposited. Once deposition is complete, the body is heated to collapse the substrate tube and obtain a consolidated core rod in which the substrate tube constitutes the outer portion of the inner cladding material. To obtain a finished preform, the overcladding tube is typically placed over the core rod, and the components are heated and collapsed into a solid, consolidated preform, as discussed in U.S. Pat. No. 4,775,401, the disclosure of which is hereby incorporated by reference.

Because the outer cladding of a fiber is distant from transmitted light, the overcladding glass does not have to meet the optical performance specifications to which the core and the inner cladding must conform. For this reason, efforts to both ease and speed manufacture of fiber preforms focused on methods of making overcladding tubes. One area of such efforts is the use of a sol-gel casting process.

U.S. Pat. No. 5,240,488 (the '488 patent), the disclosure of which is hereby incorporated by reference, discloses a sol-gel casting process capable of producing crack-free overcladding preform tubes of a kilogram or larger. In particular, the '488 patent describes use of polymer additives, e.g., binders and lubricants to improve the physical properties of the gelled bodies. According to the '488 patent, a silica dispersion is provided, and stabilized by addition of a base such as tetramethylammonium hydroxide. Polymer additives are mixed in, and the mixture is allowed to age. A gelling agent is added to induce gellation, and, typically, once the gelling agent is added, but before gellation occurs, the mixture is pumped into a tubular mold containing a central mandrel, in which the gel is aged for 1 to 24 hours. The mandrel is removed, and the gelled body is then extracted from the mold, typically by launching the body from the mold in water to prevent breakage. The body is then dried, heated to remove volatile organic materials, dehydroxylated (typically by a chlorine treatment), and then sintered to form the finished overcladding.

As discussed in U.S. Pat. No. 5,344,475 (the '475 patent), the disclosure of which is hereby incorporated by reference, the presence of refractory oxide particles, e.g., zirconia, chromia, in a silica overcladding tube reduces the strength of the resultant fiber because fracture tends to begin at such flaws. The presence of such oxide particles is typically unavoidable in a sol-gel process, however, due to contamination introduced both in the initial silica dispersion and by the mixing and molding equipment. Techniques were therefore developed for reducing to acceptable levels the concentration of such particles in sol-gel overcladding tubes. The '475 patent describes the use of centrifugation prior to gellation of the sol to remove such particles, based on the difference in size and/or density between silica particles and the refractory oxide particles. U.S. Pat. No. 5,356,447 (the '447 patent), the disclosure of which is hereby incorporated by reference, describes a further process for reducing the amount of refractory oxide particles in a gelled tube. The process relies on the treatment of the gelled tube by a chlorine-containing gas, e.g., thionyl chloride ($SOCl_2$). The process of the '447 patent is useful in preparing overcladding tubes for fiber preforms, but improvements and/or alternatives for removing refractory oxide particles from sol-gel bodies are being sought.

SUMMARY OF THE INVENTION

Refractory oxide particles are removed and/or reduced in size, in a silica body, e.g., a sol-gel derived overcladding or substrate tube, by treatment with a gaseous mixture containing one or more non-oxygenated sulfur halides. The treatment is also useful for dehydroxylating such a body. (A non-oxygenated sulfur halide is a compound containing sulfur and one or more halides, but not containing oxygen, e.g., sulfur fluorides, sulfur chlorides, sulfur iodides, sulfur bromides, as well as combinations of halides, e.g., sulfur chloro-fluorides. Combinations of different halide compounds are possible, e.g., mixtures of sulfur chlorides and sulfur fluorides. Treatment with a gaseous mixture containing a non-oxygenated sulfur halide indicates that the majority of the non-oxygenated sulfur halide or halides are formed in a reactor or furnace or introduced into the reactor or furnace by a manner other than decomposition inside the reactor or furnace of an oxygenated sulfur halide. Oxygenated sulfur chlorides include compounds containing sulfur, oxygen, and one or more halides, such as thionyl chloride—$SOCl_2$.) Due to the resultant reduction in the concentration and/or size of refractory metal oxide particles in the overcladding tube, optical fiber drawn from a preform fabricated from the treated silica body exhibits desirable strength.

Advantageously, the sulfur halide contains one or more sulfur chlorides or sulfur chloro-fluorides. Sulfur chloride includes compounds of the general formula $S_xCl_y$, e.g., sulfur monochloride ($S_2Cl_2$), sulfur dichloride ($SCl_2$), the chlorosulfanes ($S_2Cl_2$), sulfur tetrachloride ($SCl_4$), and compounds containing the radical SCl or compounds that generate the ion $SCl_3+$. (See, e.g., *Gmelin Handbuch der Anorganischen Chem*, S Eng. 2, Springer-Verlag, 1978.) Sulfur chloro-fluorides include dimerized sulfur dihalide ($S_2ClF_3$), disulfur chloride fluoride ($S_2ClF$), sulfur chloride pentafluoride ($SF_5Cl$). A sulfur chloride treatment provides desired improvements compared to treatment by thionyl chloride. For example, sulfur monochloride exhibits a zirconia removal rate from a silica gel body about three times faster than thionyl chloride at 600° C. In addition, whereas processes using thionyl chloride sometimes require an additional chlorine-treatment step to remove chromia at a desired rate, a sulfur chloride treatment is generally capable of removing chromia at an acceptable rate without such chlorine treatment. Moreover, when a sulfur chloride treatment is used instead of a thionyl chloride treatment, the chlorine remaining in the silica body is more easily and quickly removed by subsequent oxygen treatment. Also, sulfur monochloride is a relatively inexpensive compound capable of being purchased at high purity levels, and the compound lends itself to on-demand formation in a production plant. In fact, sulfur chlorides, as well as other sulfur halides, are capable of being formed by an in situ process of incorporating sulfur into the sol-gel body and then introducing the gaseous halides into the furnace containing the body.

Treatment by sulfur halides thus constitutes an improved technique useful in forming silica bodies for fiber preforms, particularly sol-gel derived overcladding or substrate tubes, the silica bodies contributing to improvements in the overall fiber fabrication process.

DETAILED DESCRIPTION OF THE INVENTION

Figure 1:
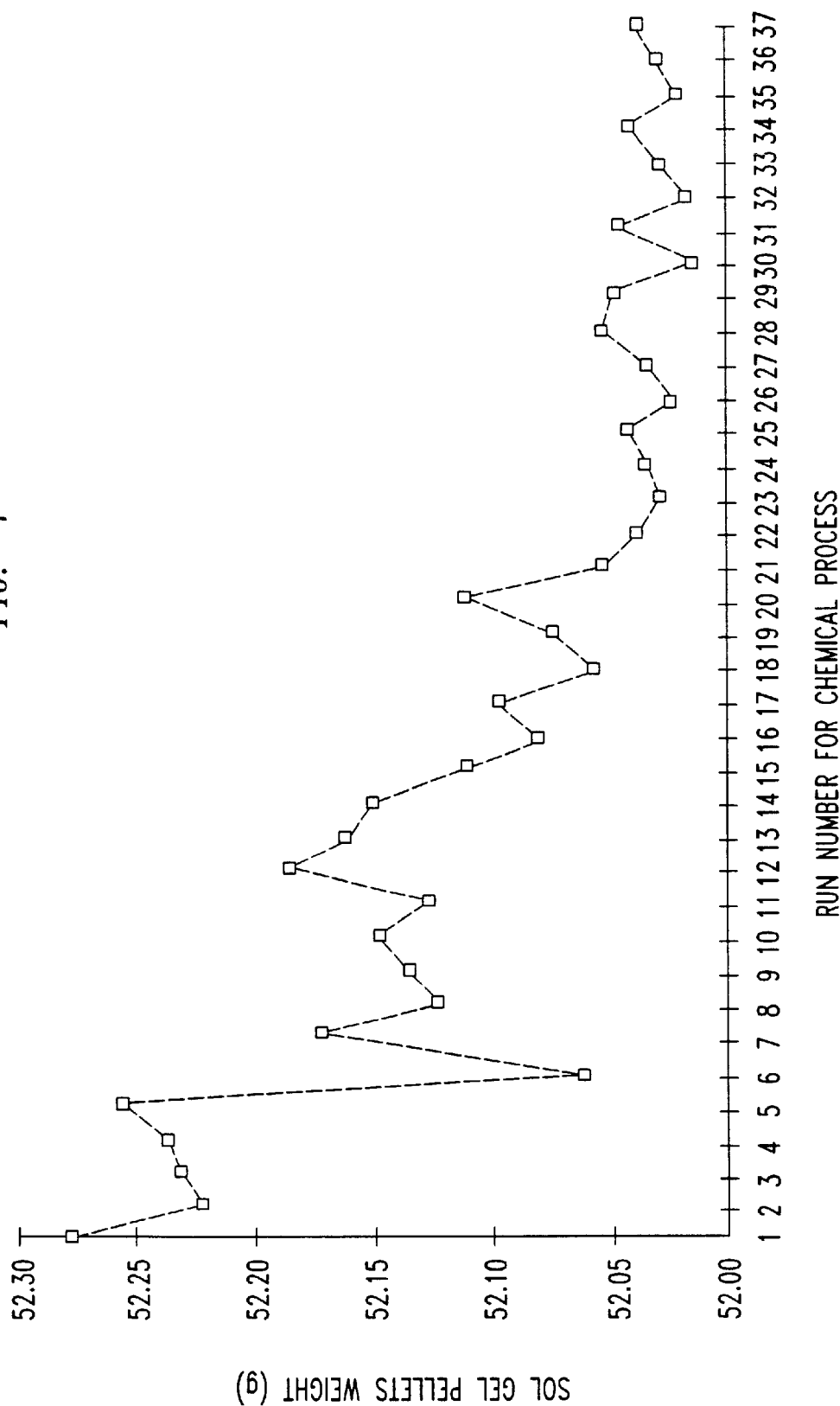
FIG. 1 shows the weight change of silica in response to a variety of treatments involving sulfur monochloride and chlorine.

Refractory oxide particles, or at least a portion thereof, are etched from, and/or dehydroxylation is performed on, a silica body by treatment with a gaseous mixture containing one or more non-oxygenated sulfur halides. (As stated above, treatment with a non-oxygenated sulfur halide indicates that the majority of the non-oxygenated sulfur halide is formed in a reactor or furnace or introduced into a reactor or furnace by a manner other than decomposition inside the reactor or furnace of an oxygenated sulfur halide.) In particular, the process is advantageous in treatment of sol-gel derived substrate and/or overcladding tubes for optical fiber preforms, but treatment of other silica bodies is also contemplated. Due to the resultant reduction in the concentration and/or size of refractory metal oxide particles from the overcladding tube, optical fiber drawn from a preform fabricated from the treated silica body exhibits desirable strength. Advantageously, the sulfur halide contains one or more sulfur chlorides or sulfur chloro-fluorides, particularly since sulfur chlorides show a relatively high selectivity toward refractory materials relative to silica, such that refractory material particles are etched without substantial effect on the silica body, as reflected in the examples below. Also, it is contemplated that sulfur halides containing fluorine will be useful for down-doping substrate tubes with fluorine during the particle etching(dehydroxylation process, which would be desirable because fluorine doping is normally a relatively difficult process. (The discussion below relates to the use of sulfur chlorides to treat sol-gel derived silica bodies, but it will apparent to one skilled in the art that the principles disclosed are applicable to other sulfur halides, including combinations of different sulfur halide compounds, as well as silica bodies produced by techniques other than sol-gel. Similarly, discussion of the use of chlorine gas is applicable to use of other halogens.)

Advantageously, the sulfur chlorides used for treatment of the sol-gel tube include sulfur monochloride ($S_2Cl_2$) and sulfur dichloride ($SCl_2$). Sulfur dichloride is commercially available in bulk form as an impure chemical containing an equilibrium mixture of sulfur dichloride, sulfur monochloride, and chlorine (theoretically with about 85% sulfur dichloride). Unlike sulfur dichloride, sulfur monochloride is commercially available in high purity. Because chlorine quantitatively converts elemental sulfur to sulfur dichloride, an equimolar mixture of chlorine gas and sulfur monochloride produces sulfur dichloride at a greater than 90% yield over a temperature range of 50 to 500° C. (with a catalyst typically used at lower temperatures to facilitate the reaction). Therefore, a starting reagent mixture of a 1:1 ratio of $Cl_2:S_2Cl_2$ will produce sulfur dichloride as a desired reagent.

Sulfur chlorides have the potential to generate undesirable gases if exposed to water, and thus on-demand production is desirable, as opposed to on-site storage of large quantities of sulfur chlorides. As discussed above, since sulfur dichloride is capable of being produced from a chlorine/sulfur monochloride gas stream, sulfur monochloride is capable of being generated on-demand. It is possible to generate sulfur monochloride by passing gaseous chlorine over molten sulfur, but the crude product of this reaction is generally contaminated with dissolved starting materials and also contains higher sulfur chlorides (see, e.g., J. W. Mellor, A Comprehensive Treatise on Inorganic and Theoretical Chemistry, Vol. 10, Longmans & Green Co., 1930, 631–684; F. Feher in Handbook of Preparative Inorganic Chemistry, Academic Press, 1963, 370–383). Fractional distillation results in pure sulfur monochloride from the crude product, but substantial purification is also possible by instead heating the crude product under conditions favoring sulfur monochloride over other sulfur chlorides. Adding excess chlorine downstream, to convert the sulfur monochloride to sulfur dichloride, is also expected to convert the less stable higher sulfur chlorides to sulfur dichloride. A distillation column located downstream of an on-demand generator would similarly be capable of separating desired sulfur chlorides from higher sulfur chlorides. Alternatively, it is possible that the higher sulfur chlorides will assist particle removal and/or dehydroxylation, or provide other desired features, such that their removal/conversion is unnecessary.

The potential exists in such an on-demand scheme for sulfur contamination. Specifically, it is possible that elemental sulfur will be transported downstream such that, upon cooling, the sulfur will deposit in and clog transfer lines. Sulfur clogging due to the use of sulfur monochloride itself is also possible, due to contact with moisture, which induces formation of elemental sulfur as a by-product of hydrolysis. This problem is capable of being eliminated or reduced by fractional distillation of the crude reaction product, by heating the transfer lines to prevent substantial sulfur plugs from forming, or by purging the transfer lines with chlorine to recycle elemental sulfur into sulfur monochloride.

Another reaction for on-demand production of sulfur monochloride is by reacting $CS_2$ with chlorine gas:

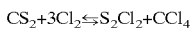

$$CS_2 + 3Cl_2 \leftrightarrows S_2Cl_2 + CCl_4$$

However, for the sol-gel process, carbon tetrachloride not only must be scrubbed from the resulting gas to prevent carbon contamination of a sol-gel tube, but the $CCl_4$ is also considered a greenhouse gas for which emission must be tightly controlled. Other preparations for sulfur monochloride are also possible, and are available in published literature.

Another possibility for on-demand formation of sulfur chlorides is in situ formation in the sol-gel bodies themselves. Specifically, it is possible to introduce sulfur into sol-gel bodies, e.g., by adding a sulfur-containing compound such as an organosulfur compound, an inorganic sulfur compound, or elemental sulfur to the silica mixture used to form the body, at any stage in the body's preparation. Chlorine gas is then flowed into a reactor containing the bodies to form one or more sulfur chlorides, and possibly a silica sulfur chloride. The non-sulfur components of the sulfur-containing compound are typically removed during the organic burnout step and/or purification and dehydroxylation of the body, with the particular requirements for removal depending on the sulfur-containing compound used. This in situ method has the potential to form higher sulfur chlorides, as discussed above.

The sulfur chlorides, if flowed into a reaction furnace, are typically carried in a carrier gas that does not interfere with the reaction, i.e., does not prevent removal of refractory oxide particles and/or dehydroxylation. Examples include air and nitrogen, as well as noble gases such as helium, argon, and neon.

Treatment with one or more sulfur chlorides is useful for dehydroxylating sol-gel bodies, e.g., removing hydroxyl groups and water, as well as removing refractory metal oxide particles (i.e., reducing their concentration) and/or reducing the size of such particles. The chemical mechanisms by which the sulfur chlorides etch metal oxide particles are not known, but the etching of such particles is clear, as reflected in the examples below.

Suitable process for treating sol-gel silica tubes (e.g., having an inner diameter of about 20 mm, and outer diameter of about 70 mm) to dehydroxylate the tubes and/or remove refractory metal oxide particles are as follows.

Tubes formed from a sol-gel process (hereafter, sol-gel tubes), such as U.S. Pat. No. 5,240,488, referenced previously, are placed into a furnace capable of uniformly heating the tubes. It is possible for the tubes to be oriented either vertically or horizontally in the furnace. Typically, the tubes are placed into a quartz muffle inside the furnace, where the muffle is capable of withstanding pressure of 2 psi and has inlet and outlet ports such that gas is able to flow uniformly over the tubes. The furnace should be capable of uniformly heating the tubes at temperatures from 300 to 900° C., allowing for the temperature to be ramped up and down as desired, and the furnace and muffle should be constructed to prevent ambient air and moisture from entering.

The tubes are treated with the gaseous mixture containing one or more non-oxygenated sulfur chlorides. It is possible to use any combination of sulfur chlorides, e.g., a single compound, such as sulfur monochloride, or a mixture of two or more sulfur chloride compounds, such as sulfur dichloride mixed with sulfur monochloride. It is possible to provide the sulfur chloride in several ways, e.g., flowing a sulfur chloride-containing gas into the furnace, or generating the sulfur chloride in situ, as discussed above. For these typical sol-gel tubes described above, about 2 hours at 650° C. of diffusion time is generally needed to achieve a uniform concentration of sulfur chlorides in the tube, i.e., to allow the sulfur chloride to fully penetrate the tube and thereby perform the desired dehydroxylation and/or particle etch. The required diffusion time, however, depends on the temperature and thickness of the gel body which must be penetrated, as well as the volume percent of sulfur chloride present. In particular, lower temperatures, thicker gel bodies, and lower volume percent of sulfur chlorides will require longer diffusion times, while higher temperatures, thinner gel bodies, and greater volume percent of sulfur chlorides will require shorter diffusion times.

Dehydroxylation, including removal of water and/or hydroxyl, as well as reduction of silanol, is typically performed (a) during the temperature ramp-up for particle removal, (b) after attainment of a desired temperature, or (c) by treating with chlorine gas instead of sulfur chloride.

(a) Dehydroxylation during temperature ramp-up: To perform dehydroxylation during the temperature ramp-up, addition (or in situ generation) of the sulfur chloride-containing gas advantageously begins at about 400° C., but temperatures as low as 300° C. are possible. (Below 300° C., it is believed that elemental sulfur deposition will be problematic.) The sulfur chloride-containing gas is advantageously added (or generated) after water evolution from the sol gel body has dropped to a low rate - less than 0.1 vol. % in outgoing gas stream—in order to improve the effectiveness of the sulfur chloride reagent. The sulfur chloride-containing gas is added (or generated) until the temperature for particle removal (described below) is reached, typically about 2 to about 3 hours. Advantageously, the gaseous mixture contains about 6 to about 7 vol. % sulfur chloride, with lower or higher concentrations (e.g., ranging from 0.1 to 100 vol. %) requiring longer or shorter reaction times, respectively.

(b) Dehydroxylation after attaining reaction temperature: Alternatively, addition (or generation) of the sulfur chloride is initiated after the tubes stabilize at the reaction temperature desired for particle removal, advantageously about 600 to about 700° C., although temperatures of 300–900° C. are possible, with 400 to 800° C. more typical. (As mentioned above, at less than 300° C., sulfur deposition is potentially a problem. Above 900° C., sulfur chloride tends to attack, i.e., etch, silica to an undesirable degree.) Introducing or generating a gaseous mixture containing about 6 to about 7 vol. % sulfur chloride for about 2 hours at about 600 to about 700° C. is typically adequate to substantially dehydroxylate sol-gel overcladding tubes, with higher or lower concentrations (e.g., 0.1 to 100 vol. %) requiring correspondingly shorter or longer reaction times, respectively. As discussed below, this same two-hour treatment is generally effective in reducing the concentration of refractive metal oxide particles.

(c) Dehydroxylation by chlorine gas treatment: It is possible to dehydroxylate by treatment with chlorine gas. A typical chlorine treatment involves 2 to 12 hours at temperatures of 800 to 1000° C., with 50 to 90 vol. % $Cl_2$ in air or nitrogen, with the flow depending on the particular reactor. Where a sol-gel body is dehydroxylated by chlorine, subsequent treatment by sulfur monochloride, followed by oxygen, is relatively efficient at removing the chlorine. This removal is believed to occur by a multi-step replacement of Si-Cl bonds formed during dehydroxylation with Si—O—Si bonds, which constitute the network structure of the sol-gel tube.

Reduction in the size of at least a portion of the refractory metal oxide particles and/or reduction of the particle concentration is typically performed as follows. As discussed more fully below, it is possible to perform a treatment with (a) sulfur chloride alone, or (b) a chlorine pre-treatment followed by sulfur chloride treatment, and (c) it is also possible to perform either (a) or (b) during the temperature ramp-up from a previous step of heating to remove water and organics.

(a) Sulfur chloride treatment: A sulfur chloride-containing gas is either flowed into the furnace or generated in situ. Advantageously, the tubes are treated at a temperature ranging from about 600 to about 700° C. for about two hours, although temperatures ranging from 300 to 900° C. are possible, again with 400 to 800° C. more typical. When the sulfur chloride-containing gas is flowed into the muffle reactor, the gas advantageously contains about 6 to about 7 vol. % of sulfur chloride. Higher or lower concentrations (e.g., 0.1 to 100 vol. %) are also possible, but the reaction time (including considerations of diffusion times) will typically be adjusted to shorter or longer times, respectively. Higher reaction temperatures (up to 900° C.) generally require correspondingly shorter reaction times or lower reagent concentrations due to the higher reactivity and shorter diffusion times. Because particle removal in the sol-gel tubes is diffusion limited, it is possible that lower sulfur chloride concentrations will be sufficient. Treatment with the sulfur chloride advantageously reduces the size of substantially all refractory particles to less than 0.2 $\mu$m in diameter, or removes them completely. This treatment for particles is essentially the same as treatment (b) above for dehydroxylation - this set of treatment conditions therefore is capable of both dehydroxylating and etching particles at the same time. It is also possible to dehydroxylate and reduce size/concentration of particles sequentially, e.g., by dehydroxylating during the temperature ramp-up for particle etch.

(b) Chlorine pre-treatment: It is also possible to use a pretreatment with $Cl_2$ to reduce the concentration of chromia particles, followed by treatment with a sulfur chloride to reduce the concentration of zirconia and other refractory metal oxide particles. A typical pretreatment is flowing a gas containing 15–20 vol. % $Cl_2$ into the furnace for about 1 to about 2 hours at 600 to 650° C. Following the $Cl_2$ treatment, the bodies are treated with a gaseous mixture containing sulfur chloride, for example at about 1 to about 2 vol. %, for about 1 to 3 hours at 600 to 700° C., with other ranges possible, as discussed above. With use of a chlorine pretreatment, less sulfur chloride is generally required because chromia has already been etched by the chlorine, although both lower and higher concentrations of sulfur chloride (e.g., 0.1 to 100 vol. %) are also possible. As mentioned above, the subsequent sulfur chloride treatment step also tends to ease removal of residual chlorine from the body when followed by an oxygen treatment.

This embodiment reflects the fact that chlorine is generally a more effective agent than sulfur monochloride for etching chromia. A gas containing both chlorine and sulfur monochloride, however, has a smaller chromia etch rate than either compound alone. This effect appears to be due to a poisoning synergy of the sulfur species with free chlorine, resulting, it is believed, in formation of a residual particle substantially resistant to further chemical attack. If chromia etching with chlorine is desired, the sulfur chloride treatment step should be performed subsequent to the chlorine treatment step to avoid this sulfur/free chlorine interaction. Chlorine does not appear to etch zirconia particles to a measurable degree, and the subsequent sulfur chloride treatment step is therefore useful if zirconia particles are to be removed.

(c) Treatment during temperature ramp-up: Because the purification of sol-gel bodies generally involves heating in air or inert gas at lower temperatures (e.g., from room temperature typically to about 600° C., but optionally as high as 850° C.) to remove water and organics, it possible to treat with sulfur chloride and/or chlorine after such carbon and moisture removal, while the sol-gel tubes are being ramped up to the final reaction temperature. For example, a typical heating rate for a furnace is about 1° C./minute. While the tubes are being ramped up to a final reaction temperature of 600 to 700° C., for example, a gaseous mixture could be introduced or generated containing 6 to 7 vol. % sulfur chloride about an hour before reaching the final temperature. Thus, because the typical time period required for full diffusion of sulfur chloride into a tube is two hours, the requisite reaction time at the final reaction temperature would be cut approximately in half, improving the efficiency of the overall process.

Subsequent to these sulfur chloride treatments, an oxygen treatment is generally performed. Chlorine is removed by replacement of chlorine atoms with oxygen atoms (i.e., replacing Si—Cl with Si—O—Si), since chlorine is an undesirable impurity in optical fiber. For example, it is possible to flow air or an oxygen/chlorine mixture over the tubes for 2 to 12 hours at temperature of 800 to 1000° C. and at 10–100 slm. In addition, the etching efficiency of sulfur monochloride appears to be insensitive to the presence of oxygen in the reaction atmosphere, such that oxygen and sulfur chlorides are capable of being mixed without detrimental effects on particle removal.

While the discussion above presents separate considerations for dehydroxylation and particle removal, it is clear that a single sulfur chloride treatment will perform both functions to varying degrees depending on the particular conditions. Control runs are easily performed to determine suitable operating conditions for a desired outcome.

The invention will be further clarified by the following examples, which are intended to be exemplary.

EXAMPLES

Experimental Methods

Etching rates of both refractory particle samples ($Cr_2O_3$ and $ZrO_2$) and sample pellets of dried silica sol-gel (i.e., samples of gelled silica sol that had undergone a drying step) were measured. Particle samples were obtained commercially, dispersed in a 0.1% xanthan gum solution in water plus a wetting agent, and ultrasonicated to ensure dispersion. The particles were then spread on a silica plate and dried at 100° C. to remove the water. The silica sol-gel samples were prepared by conventional methods such as disclosed in U.S. Pat. No. 5,240,488, referenced previously. The samples were placed in the center of a 4.2 cm outer diameter, 3.8 cm inner diameter quartz tube placed in a tube furnace, with mullite muffles placed in the tube near both ends of the furnace. Refractory particle samples were dispersed on a silica slide containing a grid. The change in refractory particle moles occurring due to various treatments was measured by taking photographs, at 320x magnification, of the grid before and after the treatments, and measuring the diameter change. The molar loss calculations were based on the assumption that the particles were spheres and that etching occurred isotropically. The etching rates were calculated from the moles lost from the particles as a function of reaction time and reagent concentration. The moles removal rate, K, in moles/hour is given by:

$$K = 4\pi(r_i^3 - r_f^3)\rho/3Mt \quad (1)$$

where $r_i$ and $r_f$ are the initial and final particle radii, respectively; $\rho$ is the bulk material density; M is the molecular weight; and t is the etching time. (Densities of 5.21 g/cm$^3$ and 5.6 g/cm$^3$ and molecular weights of 151.00 g/mole and 123.22 g/mole were used for hexagonal chromia and monoclinic zirconia, respectively.) The molar removal rate, K, showed a dependence on particle radii, and thus both molar removal rate per initial particle surface area ($4\pi r_i^2$), KSA (in units of moles/m$^2$-hour), and molar removal rate per initial particle volume ($4\pi r_i^3/3$), Kv (in units of moles/m$^3$-hour), were calculated as follows:

$$K_{SA} = (r_i^3 - r_f^3)\rho/3Mr_i^2 t \quad (2)$$

$$K_V = (r_i^3 - r_f^3)\rho/Mr_i^3 t \quad (3)$$

The effect of reagents on silica pellets was determined from weight loss measurements. Specifically, five sol-gel pellets (2.5 cm diameter×1.6 cm thick) were placed in quartz boat, and the weight changes in the boat were measured after each reaction (within a few minutes of being removed from the furnace to prevent weight changes due to exposure to air).

Reagent and buffer gases were introduced into the reaction chamber through calibrated mass flow controllers. Liquid reagents—sulfur monochloride (obtained from Aldrich, 98% pure) and thionyl chloride (obtained from Aldrich, 99+% pure)—were introduced by a conventional heated bubbler set-up, with nitrogen as the transport gas (at 125 sccm). Reagent gases of oxygen and chlorine were added downstream of the bubbler just before the furnace. Nitrogen (at 125 sccm) was also used as a buffer gas in some circumstances, in which case the nitrogen was introduced downstream of the bubbler.

Examples 1–4
(Reflected in Tables 1–4, Respectively)

Table 1 shows the surface area normalized etching rates ($K_{SA}$) for chromia particles, as a fiction of etching reagent, temperature, and particle size, for reagents of sulfur monochloride ($S_2Cl_2$), $Cl_2$ plus sulfur monochloride, $Cl_2$ alone, and thionyl chloride. Table 2 shows the surface area normalized etching rates ($K_{SA}$) for zirconia particles, as a function of etching reagent, temperature, and particle size, for reagents of sulfur monochloride, $Cl_2$ plus sulfur monochloride, $Cl_2$ alone, and thionyl chloride. Tables 3 and 4 show the volume normalized etching rates ($K_V$) for chromia and zirconia particles, respectively, as a function of etching reagent and temperature, for a wide variety of particle sizes (about 3 to about 15 µm), for reagents of sulfur monochloride, $Cl_2$ plus sulfur monochloride, $Cl_2$ alone, and thionyl chloride.

As shown in the Tables, sulfur monochloride effectively etches both chromia and zirconia particles over temperatures ranging at least from 600 to 650° C., with the etching rates for zirconia being faster for equivalent reaction temperatures and sulfur monochloride concentrations. The Tables also show that chlorine is an effect etching agent, by itself, for chromia particles, but chlorine does not appear to etch zirconia to a measurable degree. In addition, the Tables indicate that the etching efficiency of sulfur monochloride appears to be insensitive to the presence of oxygen, in contrast to thionyl chloride.

TABLE 1

Surface Area normalized etching rate ($K_{SA}$) for chromia particles (in moles/hr-m$^2$)

| Particle Size→<br>Reagent – Temp.↓ | 5 µm | 8 µm | 12 µm |
|---|---|---|---|
| 12% $Cl_2$ – 950° C. | (0.5)[a] | (0.5)[a] | (0.5)[a] |
| 17% $Cl_2$ – 600° C. | 0.041 | 0.074 | 0.096 |
| 17% $Cl_2$ – 650° C. | 0.062 | 0.094 | 0.104 |
| 1.2% $S_2Cl_2$ – 600° C. | 0.0026 | 0.0041 | 0.0054 |
| 1.2% $S_2Cl_2$ – 650° C. | 0.0026 | 0.0053 | 0.0080 |
| 6.4% $S_2Cl_2$ – 650° C. | 0.052 | 0.084 | 0.068 |
| 1.2% $S_2Cl_2$/3.1% $Cl_2$ – 650° C. | 0.0034[b] | 0.0048[b] | 0.0071[b] |
| 1.2% $S_2Cl_2$/17% $Cl_2$ – 600° C. | 0.0027 | 0.0043 | 0.0055 |
| 1.2% $S_2Cl_2$/17% $Cl_2$ – 650° C. | 0.0025[b] | 0.0042[b] | 0.0084[b] |
| 17% $SOCl_2$ – 650° C. | 0.0075 | 0.010 | 0.011 |

[a]Average reaction rates for a variety of particle sizes.
[b]Slowest rate observed - rate not constant with time.

TABLE 2

Surface Area normalized etching rate ($K_{SA}$) for zirconia particles (in moles/hr-m$^2$)

| Particle Size→<br>Reagent – Temp.↓ | 5 µm | 8 µm | 12 µm |
|---|---|---|---|
| 12% $Cl_2$ – 900° C. | 0[a] | 0[a] | 0[a] |
| 17% $Cl_2$ – 650° C. | <0.0009 | <0.0004 | <0.0010 |
| 1.2% $S_2Cl_2$ – 600° C. | 0.093 | 0.13 | 0.20 |
| 1.2% $S_2Cl_2$ – 650° C. | >0.11[b] | >0.18[b] | >0.28[b] |
| 6.4% $S_2Cl_2$ – 650° C. | 1.7 | 3.5 | 5.5 |
| 1.2% $S_2Cl_2$/17% $Cl_2$ – 600° C. | >0.11 | >0.18 | >0.27 |
| 1.2% $S_2Cl_2$/17% $Cl_2$ – 650° C. | >0.12 | >0.18 | >0.27 |
| 1.2% $S_2Cl_2$/0.52% $O_2$ – 600° C. | >0.058 | >0.058 | >0.058 |
| 17% $SOCl_2$ – 650° C. | 0.090 | 0.061 | |
| 18% $SOCl_2$ – 650° C. | 2.3 | 3.5 | 5.4 |

[a]Average reaction rates for a variety of particle sizes.
[b]Lower limits for rates measured at same reaction time as the 1.2% $S_2Cl_2$/17% $Cl_2$ samples. Rates of 0.34 (for 5 µm), 0.65 (for 8 µm), and 0.78 (for 12 µm) moles/hr-m$^2$ for 1.2% $S_2Cl_2$ were determined more accurately using shorter reaction times of 1 to 5 minutes. These short times were not used for the 1.2% $S_2Cl_2$/17% $Cl_2$ mixture, because observations indicated that the two components would have been insufficiently mixed to provide reliable results in this time period.

TABLE 3

Volume normalized etching rates ($K_V$) for chromia particles (in moles/hour)

| | Reaction Temperature | |
|---|---|---|
| Reagent | 600° C. | 650° C. |
| 17% $Cl_2$ | ≧2.4 ± 0.2 | 2.4 ± 0.7 |
| 1.2% $S_2Cl_2$ | 0.09 ± 0.03 | 0.14 ± 0.04 |
| 6.4% $S_2Cl_2$ | — | 2.1 ± 1.0 |
| 1.2% $S_2Cl_2$ + 3.1% $Cl_2$ | — | 0.11[a] ± 0.02 |
| 1.2% $S_2Cl_2$ + 17% $O_2$ | 0.09[a] ± 0.00 | 0.10[a] ± 0.03 |
| 17% $SOCl_2$ | — | 0.19 |

[a]Reaction rate is not constant with time, because number of moles consumed appeared to be the same at an early time (3 hrs total reaction time) and later times (5 and 7 hours total reaction time).

TABLE 4

Volume normalized etching rates ($K_V$) for zirconia particles (in moles/hour)

| Reagent | Reaction Temperature 600° C. | 650°°C. |
|---|---|---|
| 17% $Cl_2$ | — | <0.025 |
| 1.2% $S_2Cl_2$ | 2.3 ± 0.6 | >3.0[a] |
| 6.4% $S_2Cl_2$ | — | 58 ± 4 |
| 1.2% $S_2Cl_2$ + 17% $Cl_2$ | >3.0 | >3.0 |
| 1.2% $S_2Cl_2$ + 0.52% $O_2$ | 1.50 ± 0.02 | — |
| 17% $SOCl_2$ | — | 1.7 |
| 18% $SOCl_2$ | — | 59.0 ± 1.5 |

[a]Lower limits for rates measured at same reaction time as the 1.2% $S_2Cl_2$/17% $Cl_2$ samples. A rates of 11.7 ± 0.3 moles/hr for 1.2% $S_2Cl_2$ was determined more accurately using shorter reaction times of 1 to 5 minutes. These short times were not used for the 1.2% $S_2Cl_2$/17% $Cl_2$ mixture, because observations indicated that the two components would have been insufficiently mixed to provide reliable results in this time period.

Example 5

Reactivity of Silica Gel Bodies to Sulfur Monochloride

Prior to reactivity measurements, the silica pellets underwent an organic burnout, and were then dehydroxylated by a chlorine treatment such as described above. The silica pellets were subjected to various treatments by chlorine, oxygen, and/or sulfur monochloride to monitor the treatments' effects on silica, as reflected in Table 5, with the weight after each Run plotted in FIG. 1.

TABLE 5

Chemical Treatments of Silica Pellets

| Run Number | Chemical Process Used* |
|---|---|
| 1 | Initial Weight |
| 2 | 1 |
| 3–4 | 4 |
| 5 | 1 |
| 6 | 3 |
| 7 | 1 |
| 8 | 4 |
| 9–14 | 1 |
| 15–19 | 2–6 hours $O_2$ |
| 20–21 | 2–29 hours $O_2$ |
| 22 | 4 |
| 23–24 | 2–29 hours $O_2$ |
| 25 | 2–6 hours $O_2$ |
| 26 | 2–29 hours $O_2$ |
| 27 | 3 |
| 28 | 2–6 hours $O_2$ |
| 29–30 | 2–29 hours $O_2$ |
| 31 | 2–6 hours $O_2$ |
| 32–33 | 2–29 hours $O_2$ |
| 34 | 2–6 hours $O_2$ |
| 35 | 2–29 hours $O_2$ |
| 36–37 | 3 |
| 38 | 2–29 hours $O_2$ |

*1: One hour reaction with 5 vol. % chlorine in nitrogen at 950° C.
2: One hour reaction with 5 vol. % chlorine in nitrogen at 950° C., followed by reaction with pure oxygen at 1000° C.
3: One hour reaction with 5 vol. % chlorine in nitrogen at 950° C., six hour reaction with 6.4 vol. % sulfur monochloride in nitrogen at 650° C., and reaction with pure oxygen at 1000° C. for 6 to 21 hours, depending on the circumstances of the particular run (with no measurable difference caused by different time periods within this 6 to 21 range).
4: Left in flowing nitrogen at room temperature.

In general, as seen in FIG. 1, weight increases result from processing step 1—reaction with chlorine without subsequent processing. (The weight decrease seen at Run 2 is due to removal of a relatively substantial amount of water from the pellets.) Weight decreases generally result from processing steps 2 and 3—reaction with chlorine, followed by reaction with oxygen alone or oxygen and sulfur monochloride. Initially, therefore, it appears that the chlorine dehydroxylates the silica, replacing —OH with —Cl. Oxygen treatment then appears to replace, at least partially, chlorine with oxygen. In addition, sulfur monochloride does not appear to attack the silica at the 650° C. processing temperature, since a stable weight was reached by process 3 such that subsequent processing by process 2 produced no additional weight loss. This conclusion is further supported in that process 2 and 3 produced substantially identical weight decreases when performed on silica pellets.

Other embodiments of the invention will be apparent to those skilled in the art from consideration of the specification and practice of the invention disclosed herein.

What is claimed is:

1. A process for preparing optical fiber, comprising the step of drawing fiber from a preform comprising a sol-gel silica tube, the tube formed by a process including the steps of, prior to sintering the tube:
   providing a silica dispersion,
   forming from the dispersion a gelled tube comprising water, hydroxyl groups, and refractory metal oxide particles,
   heating the entire tube to a temperature ranging from 400 to 800° C., and
   while the tube is at the temperature, treating the tube with a gaseous mixture comprising one or more non-oxygenated sulfur halides, the treatment performed for a time period that provides sufficient diffusion of the one or more sulfur halides into the tube such that at least one effect selected from the group consisting of reducing the concentration of water and hydroxyl groups in the tube, reducing the size of at least a portion of the refractory metal oxide particles in the tube, and reducing the concentration of refractory metal oxide particles in the tube is achieved, and
   subsequent to treating with the gaseous mixture, flowing a gas comprising oxygen over the tube, such that chlorine is removed from the tube.

* * * * *